US009286057B2

(12) United States Patent
Garratt et al.

(10) Patent No.: US 9,286,057 B2
(45) Date of Patent: Mar. 15, 2016

(54) UPDATING SOFTWARE BASED ON UTILIZED FUNCTIONS

(71) Applicant: International Business Machines Corporation, Armonk, NY (US)

(72) Inventors: Andrew M. Garratt, Hampshire (GB); Andrew D. Humphreys, Hampshire (GB); Martin G. Keen, Cary, NC (US); John J. P. McNamara, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/301,468

(22) Filed: Jun. 11, 2014

(65) Prior Publication Data

US 2015/0363185 A1     Dec. 17, 2015

(51) Int. Cl.
*G06F 9/44*       (2006.01)
*G06F 9/445*      (2006.01)

(52) U.S. Cl.
CPC .. *G06F 8/65* (2013.01); *G06F 8/60* (2013.01); *G06F 8/61* (2013.01); *G06F 8/68* (2013.01)

(58) Field of Classification Search
CPC ............................................. G06F 8/60–8/77
See application file for complete search history.

(56) References Cited

U.S. PATENT DOCUMENTS

| 8,370,825 B2 | 2/2013 | Curtis et al. | |
| 8,918,774 B2* | 12/2014 | Hansmann | G06F 8/68 |
| | | | 717/168 |
| 2004/0255290 A1* | 12/2004 | Bates | G06F 11/0748 |
| | | | 717/174 |
| 2007/0220510 A1* | 9/2007 | Bell | G06F 9/4446 |
| | | | 717/174 |
| 2009/0222811 A1* | 9/2009 | Faus | G06F 8/65 |
| | | | 717/173 |
| 2010/0058313 A1* | 3/2010 | Hansmann | G06F 8/68 |
| | | | 717/168 |
| 2013/0042230 A1 | 2/2013 | Little et al. | |
| 2013/0326499 A1* | 12/2013 | Mowatt | G06F 8/60 |
| | | | 717/177 |
| 2014/0068591 A1* | 3/2014 | Harding et al. | 717/171 |

(Continued)

FOREIGN PATENT DOCUMENTS

CN         101636720 A     1/2010

OTHER PUBLICATIONS

Hicks, Michael et al., "Dynamic Software Updating", 2001, pp. 13-23.*

(Continued)

*Primary Examiner* — Thuy Dao
*Assistant Examiner* — Christopher Franco
(74) *Attorney, Agent, or Firm* — Daniel R. Simek

(57) ABSTRACT

In a method for managing updates for a software product, receiving a request to install a software product update, wherein the software product update modifies a software product on a computing device. The method further includes identifying a first set of one or more functions of the software product that are to be modified by the software product update. The method further includes identifying historical usage information corresponding to the software product, wherein the historical usage information indicates a second set of one or more functions of the software product and a number of times each respective function of the second set of one or more functions of the software product has been used by the computing device. The method further includes determining whether the software product update modifies at least one function of the software product that corresponds to historical usage information that exceeds a minimum usage threshold condition.

15 Claims, 3 Drawing Sheets

(56) References Cited

U.S. PATENT DOCUMENTS

2015/0205595 A1* 7/2015 Dudai ................ G06F 8/65
717/168
2015/0227358 A1* 8/2015 Lavoie ................ H04L 67/12
717/173

OTHER PUBLICATIONS

Jones, Wendell et al., "Application of a Usage Profile in Software Quality Models", 1999, pp. 1-10.*

Canavera, Kyle et al., "Mining the Execution History of a Software System to Infer the Best Time for Its Adaptation", 2012, pp. 1-11.*

Giurgiu, Ioana et al., "Dynamic Software Deployment from Clouds to Mobile Devices", 2012, pp. 394-414.*

Snipes, Will et al., "Approximating Deployment Metrics to Predict Field Defects and Plan Corrective Maintenance Activities", 2009, pp. 90-98.*

Roberts, Dave et al., "Exploring the use of Local Consistency Measures as Thresholds for Dead Reckoning Update Packet Generation", 2005, pp. 1-6.*

Wikipedia, "Gcov", retrieved from wikipedia, the free encyclopedia onlinefrom website: <http://en/wikipedia.org/w/index.php?title=Gcov>, and was last modified on Jan. 20, 2014 at 10:33.

* cited by examiner

UPDATING SOFTWARE BASED ON UTILIZED FUNCTIONS

FIELD OF THE INVENTION

The present invention relates generally to the field of updating software, and more particularly to updating software based on utilized functions.

BACKGROUND

A software update, or software patch is a piece of software that is designed to update a computer program or data that is associated with a computer program. Some examples of software updates are designed to fix security vulnerabilities, errors that may occur in the program code, or other bugs associated with the computer program. Some computer programs include a functionality to update themselves via the Internet, with minimal user intervention. Software updates can vary in size, from a few kilobytes to hundreds of megabytes.

A software update can be in the form of a fix pack, which also provides an indication of a cumulative collection of code fixes that have been made since the last release of the product. A fix pack can impact a wide array of functions in the corresponding computer program. For example, a fix pack can include a software update, indications of program code fixes in the software update, and functions that the program code fixes update in the corresponding computer program.

SUMMARY

Aspects of the present invention disclose a method, computer program product, and system for managing updates for a software product. The method includes one or more processors receiving a request to install a software product update, wherein the software product update modifies a software product on a computing device. The method further includes one or more processors identifying a first set of one or more functions of the software product that are to be modified by the software product update. The method further includes one or more processors identifying historical usage information corresponding to the software product, wherein the historical usage information indicates a second set of one or more functions of the software product and a number of times each respective function of the second set of one or more functions of the software product has been used by the computing device. The method further includes one or more processors determining whether the software product update modifies at least one function of the software product that corresponds to historical usage information that exceeds a minimum usage threshold condition.

DETAILED DESCRIPTION

Embodiments of the present invention allow for identification and installation of relevant software updates. In one embodiment, in response to receiving a request to download an update to a software product, a fix pack and usage data that corresponds to the software product and update are identified. Then, based on the identified usage data, relevant software product updates are identified and installed.

Some embodiments of the present invention recognize that fix packs typically provide release notes that detail problems that are addressed in the fix pack. Information in the release notes is typically focused toward outlining the problems addressed, rather than be focused toward describing a specific impact or use case for the instance of software. Additionally, if a software update addresses a problem in a code area that is rarely used by a user, then installing the software update can lead to unintended consequences.

Figure 1:
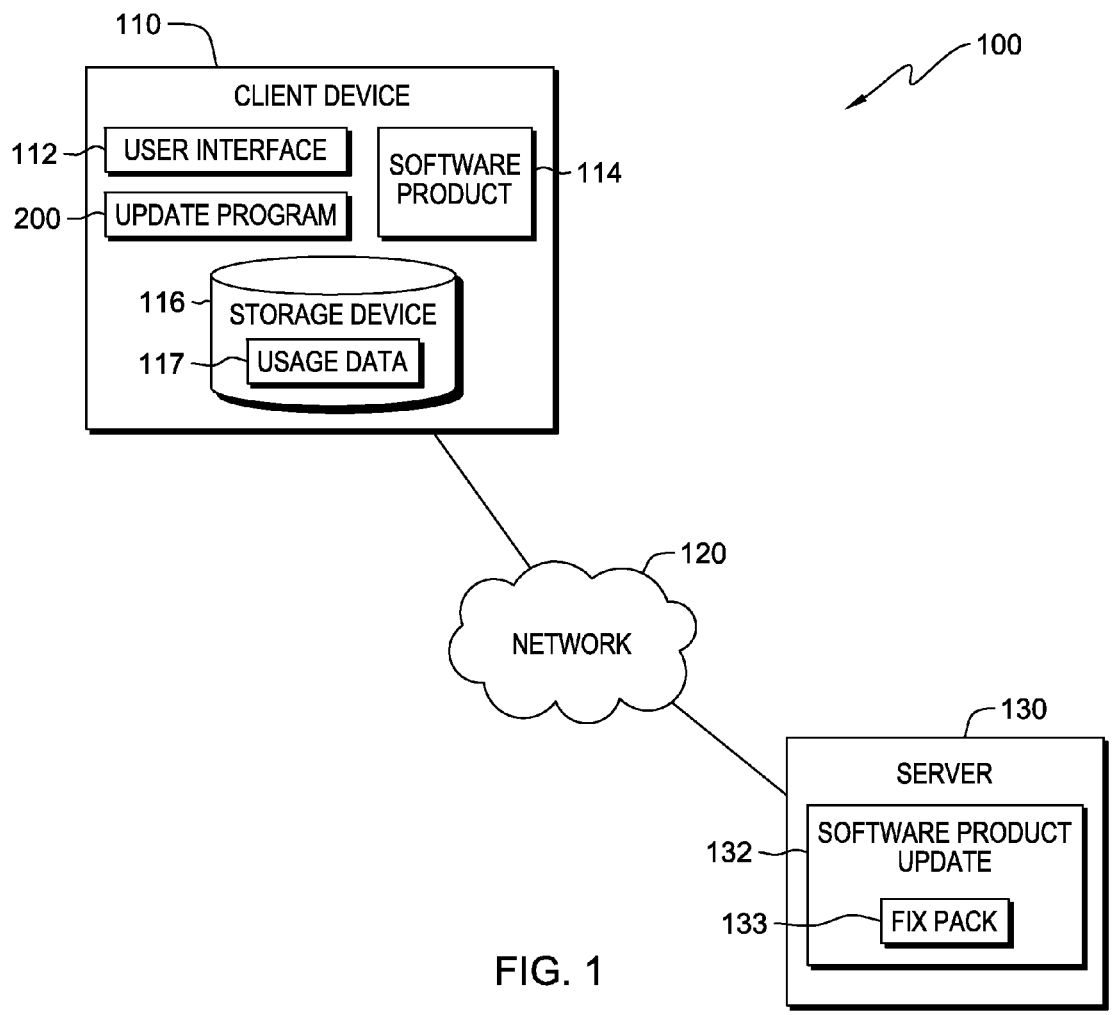
FIG. 1 is a functional block diagram of a data processing environment in accordance with an embodiment of the present invention.

The present invention will now be described in detail with reference to the Figures. FIG. 1 is a functional block diagram illustrating a distributed data processing environment, generally designated 100, in accordance with one embodiment of the present invention.

An embodiment of data processing environment 100 includes client device 110 and server 130, interconnected over network 120. In this embodiment, client device 110 can communicate with server 130, via network 120, to access and download information that is stored on server 130 (e.g., software product update 132).

In various embodiments of the present invention, client device 110 may be a workstation, personal computer, personal digital assistant, mobile phone, or any other device capable of executing computer readable program instructions in accordance with embodiments of the present invention. In general, client device 110 is representative of any electronic device or combination of electronic devices capable of executing computer readable program instructions. Client device 110 may include components as depicted and described in further detail with respect to FIG. 3, in accordance with embodiments of the present invention.

Client device 110 includes user interface 112, software product 114, storage device 116, and update program 200. User interface 112 accepts input from individuals utilizing client device 110. In example embodiments, an individual (through input via user interface 112) utilizing client device 110 can request to install an update to software product 114 (e.g., software product update 132), or provide input associated with updating software product 114. Software product 114 is any program or application that is installed on client device 110, and is capable of receiving a product update (e.g., software product update 132). Update program 200 identifies and installs relevant software updates based on usage data corresponding to a software product, in accordance with embodiments of the present invention. In another embodiment, update program 200 can be located on server 130, and client device 110 is capable of assessing and utilizing update program 200 on server 130 (e.g., via network 120).

Storage device 116 contains usage data 117. Storage device 116 can be implemented with any type of storage device, for example, persistent storage 308, which is capable of storing data that may be accessed and utilized by client device 110, and server 130, such as a database server, a hard disk drive, or flash memory. In other embodiments, storage device 116 can represent multiple storage devices within client device 110. Usage data 117 includes information about historical usage of software product 114 by client device 110.

In one embodiment, program code of software product 114 includes variable counters (e.g., on main logic paths in the program code) that indicate usage of various functions of software product 114. In an example, as usage of a function in software product triggers a variable counter in a logic path, the variable counter increments usage data 117 associated with the corresponding function of software product 114. In various embodiments, each function of software product 114 has an associated instance of usage data 117, which can be determined utilizing variable counters in the program code of software product 114.

In another embodiment, program code of software product 114 includes identifiers (IDs) (e.g., encoded alphanumeric metadata tags) that provide an indication of which sections of the program code correspond to which functions of software product 114. For example, a metadata tag indicates that a section of the program code of software product 114 corresponds to the login function of software product 114. In an example embodiment, the IDs do not include descriptive information that would reveal product internal information of software product 114.

In one embodiment, client device 110 and server 130 communicate through network 120. Network 120 can be, for example, a local area network (LAN), a telecommunications network, a wide area network (WAN) such as the Internet, or any combination of the three, and include wired, wireless, or fiber optic connections. In general, network 120 can be any combination of connections and protocols that will support communications between client device 110 and server 130 in accordance with embodiments of the present invention.

In example embodiments, server 130 can be a desktop computer, computer server, or any other computer system known in the art. In certain embodiments, server 130 represents computer systems utilizing clustered computers and components (e.g., database server computers, application server computers, etc.) that act as a single pool of seamless resources when accessed by elements of data processing environment 100 (e.g., client device 110). In general, server 130 is representative of any electronic device or combination of electronic devices capable of executing computer readable program instructions. Server 130 may include components as depicted and described in further detail with respect to FIG. 3, in accordance with embodiments of the present invention.

Server 130 includes software product update 132, which includes fix pack 133. In an example embodiment, server 130 is one or more server computers that host and provide software updates, (e.g., software product update 132 for software product 114. Software product update 132 is a software update (e.g., a patch) for software product 114, which client device 110 is capable of downloading and installing. Fix pack 133 is a component of software product update 132 that includes software update files and release notes that detail problems that software update 132 addresses. Release notes included in fix pack 133 provide an indication of which functions of software product 114 software product update 132 is intended to update. In one embodiment, release notes are included in fix pack 133 in a format that is compatible with software product 114 and software product update 132, and that software product 114 and software product update 132 is capable of utilizing.

In one embodiment, fix pack 133 includes IDs (e.g., encoded alphanumeric metadata tags) that indicate product code areas (e.g., functions in product code of software product 114) that software product update 132 is intended to update. For example, fix pack 133 includes IDs in the form of metadata tags that indicate a function of software product 114 that software product update 132 is intended to update. In another embodiment, the IDs of fix pack 133 are associated with corresponding IDs in software product 114. For example, if software product update 132 is intended to update the login function of software product 114, an ID in fix pack 133 indicates that software product update 132 is intended to update the login functionality of software product 114, via an association with the ID in the program code of software product 114 that corresponds to the login function.

Figure 2:
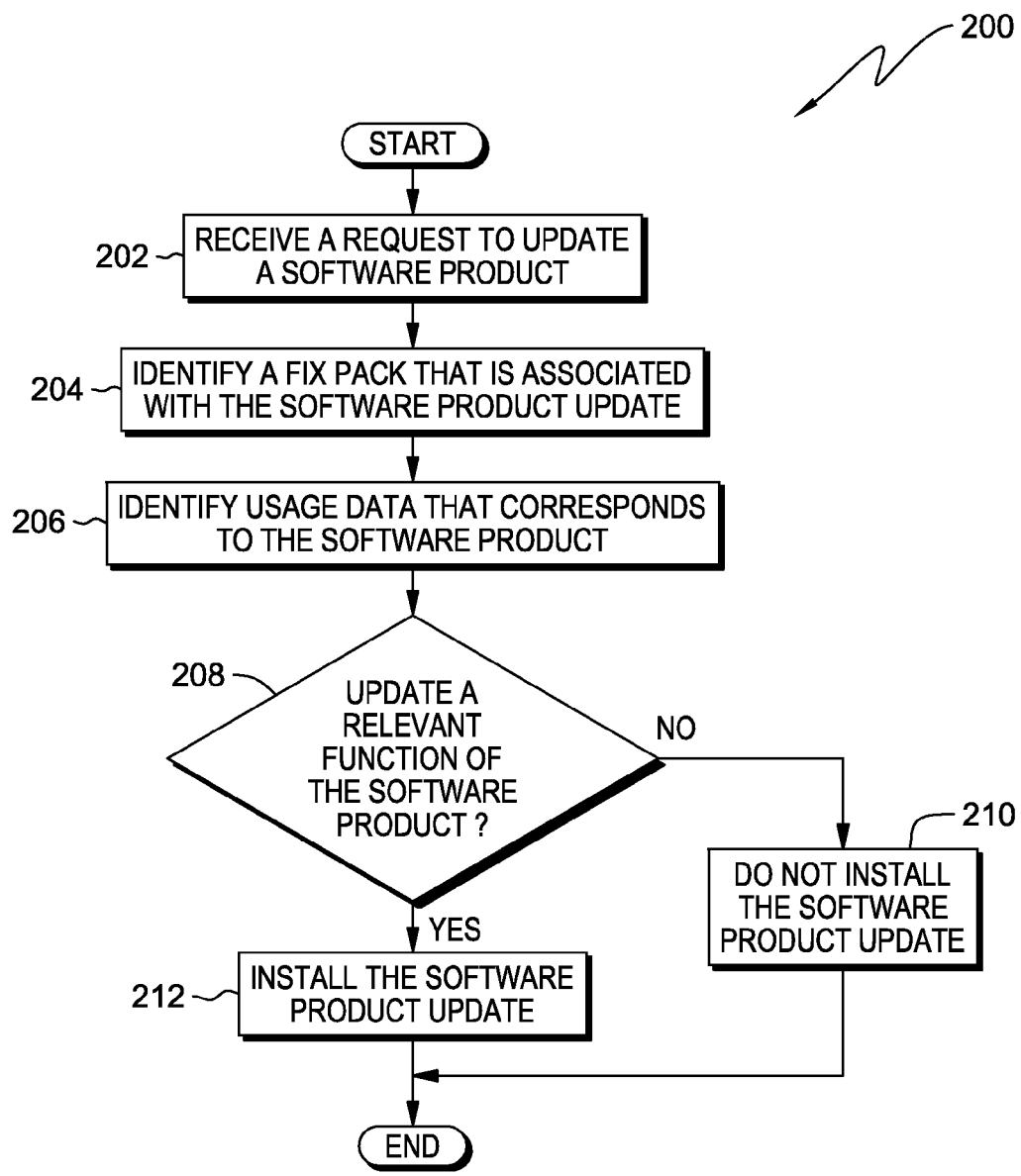
FIG. 2 is a flowchart depicting operational steps of a program for identifying and installing relevant software updates based on usage data corresponding to a software product, in accordance with an embodiment of the present invention.

FIG. 2 is a flowchart depicting operational steps of update program 200, a program for identifying and installing relevant software updates based on usage data corresponding to a software product, in accordance with an embodiment of the present invention. Update program 200 operates on client device 110 to facilitate the download and installation of updates for software and applications, such as software product 114. In one embodiment, update program 200 initiates in response to receiving a request to update a software product on client device 110 (e.g., updating software product 114 with software product update 132). Update program 200 utilizes usage data 117 that is associated with historical use of software product 114 by client device 110. In other embodiments, software product update 132 can be a mandatory update to software product 114 (e.g., antivirus definitions, security policies, audit functionality, etc.). In embodiments where software product update 132 is a mandatory update, update program 200 can automatically download and install software product update 132 to client device 110.

In step 202, update program 200 receives a request to update a software product. In one embodiment, update program 200 receives a request to update software product 114, which can include an indication to utilize software product update 132 to update software product 114. In example embodiments, update program 200 can receive a request from an individual utilizing client device 110 (e.g., via user interface 112), from client device 110 (e.g., a scheduled update of software product 114 on client device 110), from server 130 (e.g., an automated request to update software product 114), or other methods to indicate a software update. Update program 200 utilizes the received request to identify the corresponding software update (e.g., software product update 132 on server 130).

In step 204, update program 200 identifies a fix pack that is associated with the software product update. In one embodiment, update program 200 utilizes software product update 132 to identify the corresponding fix pack, (i.e., fix pack 133, which is a component of software product update 132). Fix pack 133 includes software update files and release notes that detail problems that software update 132 addresses. In one embodiment, fix pack 133 includes IDs that provide an indication of which functions of software product 114 software product update 132 can update (e.g., release notes of fix pack 133). In various embodiments, fix pack 133 includes the software update files (e.g., a patch) to be installed on client device 110 to update software product 114.

In step 206, update program 200 identifies usage data that corresponds to the software product. In one embodiment, update program 200 identifies usage data 117, in storage device 116 that corresponds to software product 114 (i.e., the software product that is being updated by software product update 132). Usage data 117 includes information about historical usage of software product 114 by client device 110. In example embodiments, usage data 117 includes the historical usage of functions of software product 114, which had been tracked through variable counters in the program code of software product 114. For example, usage data 117 includes an indication of a number of times that each function of software product has been used over a period of time (e.g., a week, a day, since a previous update to software product 114, since the initial installation of software product 114 on client device 110, etc.).

In decision step 208, update program 200 determines whether the software product update modifies a relevant function of the software product. More specifically, update program 200 determines whether a comparison of fix pack 133 (identified in step 204) to usage data 117 (identified in step 206) indicates that software product update 132 can update at least one function of software product that client device 110 has a history of utilizing (e.g., utilizing a minimum usage threshold in usage data 117).

In an example embodiment, update program 200 utilizes IDs (e.g., metadata tags) in fix pack 133 to identify functions of software product 114 that software product update 132, and fix pack 133, are going to update. Update program 200 utilizes the IDs and identified functions to identify information in usage data 117 that is associated with the identified functions of software product 114. Then, update program 200 determines whether the identified information in usage data 117 associated with software product 114 indicates that software product update 132 and fix pack 133 are intended to update at least one relevant function of software product 114. In one example, update program 200 utilizes a minimum usage threshold to determine whether a function of software product 114 is a relevant function (e.g., a minimum number of total uses, a minimum number of uses over a period of time, usage occurring within a defined time interval, etc.).

In step 210, update program 200 does not install the software product update. More specifically, responsive to determining that software product update 132 does not modify a relevant function of software product 114 (decision step 208, "no" branch), update program 200 does not install software product update 132 to client device 110. In another embodiment, update program 200 provides a recommendation to client device 110 (e.g., via a prompt through user interface 112 on client device 110) to not install software product update 132. In this embodiment, update program 200 can install software product update 132 in response to an indication (e.g., an input from a use of client device 110 through user interface 112) from client device 110 to install software product update 132. For example, update program 200 provides client device 110 a recommendation via a prompt through user interface 112 on client device 110, which includes a selectable link to install software product update 132. In embodiments where software product update 132 is a mandatory update (e.g., anti-virus definitions, etc.), update program 200 automatically downloads and installs software product update 132 to client device 110.

In step 212, update program 200 installs the software product update. More specifically, responsive to determining that software product update 132 does modify at least one relevant function of software product 114 (decision step 208, "yes" branch), update program 200 installs software product update 132 to client device 110. In one embodiment, update program 200 downloads and installs all of software product update 132 on client device 110. Installation of the entire software update allows for the instance of software product 114 on client device 110 to be a known version of software product 114. In another embodiment, update program 200 provides a recommendation to client device 110 (e.g., via a prompt through user interface 112 on client device 110) to install software product update 132. In this embodiment, update program 200 can install software product update 132 in response to an indication (e.g., an input from a use of client device 110 through user interface 112) from client device 110 to install software product update 132.

In one example, in response to receiving a request from client device 110 to update software product 114 with software product update 132 (step 202), update program 200 identifies fix pack 133, which is a component of software product update 132 (step 204). Additionally, update program 200 identifies information in usage data 117 that corresponds to historical usage of software product 114 by client device 110 (step 206).

Then, update program 200 determines whether software product update 132 modifies at least one function of software product 132 that is relevant to client device 110 (decision step 208). Update program 200 utilizes fix pack 133, which provides an indication of functions of software product 114 that can be updated by software product update 132. Update program 200 compares the functions indicated in fix pack 133 to information in usage data 117 to determine whether software product update 132 modifies at least one function of software product 132 that is relevant to client device 110. For example, fix pack 133 indicates that software product update 132 is intended to update the document merging function of software product 114. Additionally, information in usage data 117 includes information corresponding to usage of the document merging function of software product 114 corresponding to client device 110. For example, update program 200 utilizes usage data 117 to determine that client device 110 has utilized the document merging function of software product 114 seven times in the last five days. In this example, update program 200 determined that the seven uses of the document merging function is greater than a minimum usage threshold of two uses per week, and therefore the document merging function of software product 114 is a relevant function.

Then, update program 200 determines that software product update 132 does modify at least one function of software product 132 that is relevant to client device 110, because software product 132 modifies the document merging function of software product 114 (decision step 208, "yes" branch), which is relevant to client device 110. In response, update program 200 installs software product 132 on client device 110 or provides a recommendation to client device 110 to install software product update 132 (step 212).

Figure 3:
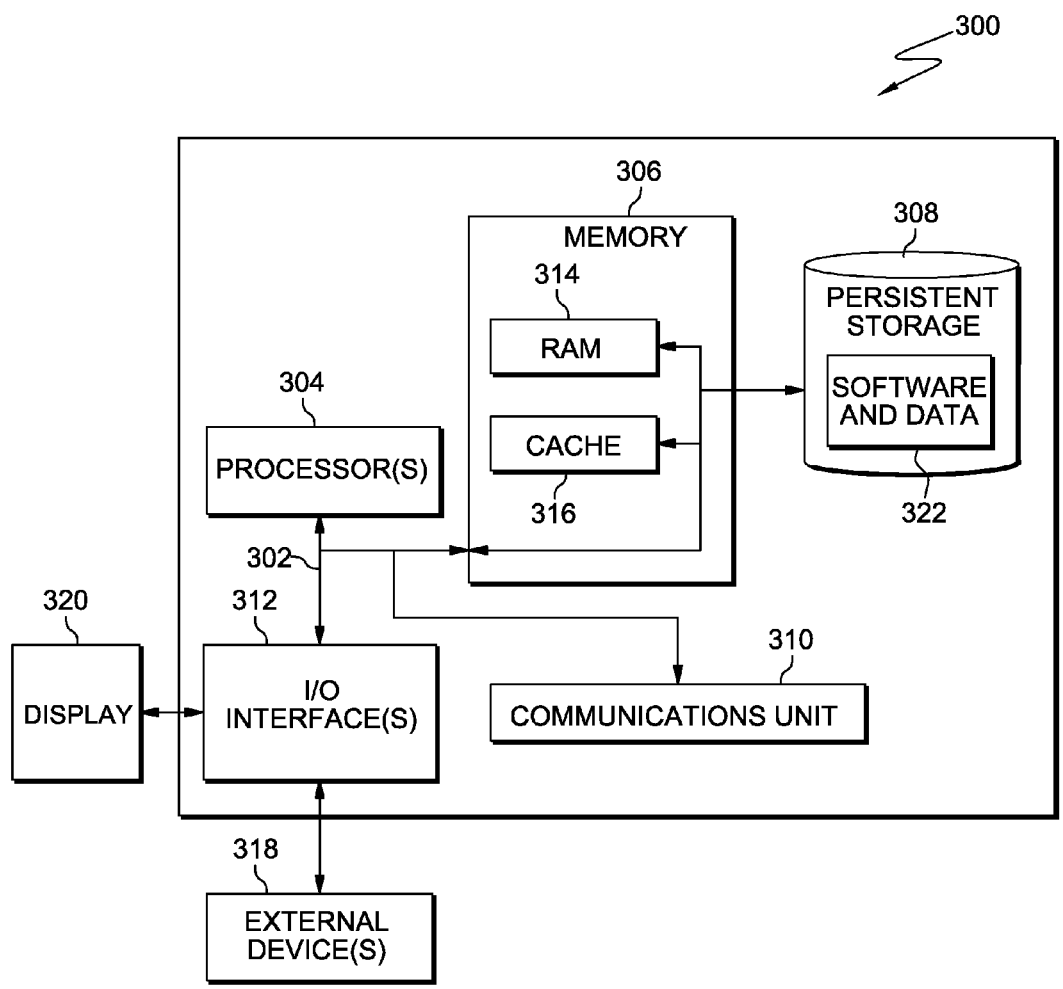
FIG. 3 depicts a block diagram of components of a computing system representative of the client device and server of FIG. 1 in accordance with an embodiment of the present invention.

FIG. 3 depicts a block diagram of components of computer 300, which is representative of client device 110 and server 130 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 406 can include any suitable volatile or non-volatile computer readable storage media. Software and data 322 are stored in persistent storage 308 for access and/or execution by processors 304 via one or more memories of memory 306. With respect to client device 110, software and data 322 includes software product 114, usage data 117, and update program 200. With respect to server 130, software and data 322 includes software product update 132 and fix pack 133.

In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 may include one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data 322 can be stored on such portable computer readable storage media and can be loaded onto persistent storage 308 via I/O interface(s) 312. I/O interface(s) 312 also can connect to a display 320.

Display 320 provides a mechanism to display data to a user and may be, for example, a computer monitor. Display 320 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing updates for a software product, the method comprising:
    receiving, by one or more processors, a request to install a software product update, wherein the software product update modifies a software product on a computing device;
    identifying, by one or more processors, a first set of one or more functions of the software product that are to be modified by the software product update;
    identifying, by one or more processors, historical usage information corresponding to the software product, wherein the historical usage information indicates a second set of one or more functions of the software product and a number of times each respective function of the second set of one or more functions of the software product has been used by the computing device;
    determining, by one or more processors, whether the first set of one or more functions of the software product and the second set of one or more functions of the software product contain at least one common function of the software product; and
    responsive to determining that the first set of one or more functions of the software product and the second set of one or more functions of the software product do contain at least one common function of the software product, determining, by one or more processors, that one or more of the at least one common function has corresponding historical usage information that exceeds the minimum usage threshold condition.

2. The method of claim 1, further comprising:
    responsive to determining that the software product update does modify at least one function of the software product that corresponds to historical usage information that exceeds a minimum usage threshold condition, installing, by one or more processors, the software product update on the computing device.

3. The method of claim 1, further comprising:
    responsive to determining that the software product update does not modify at least one function of the software product that corresponds to historical usage information that exceeds a minimum usage threshold condition, providing, by one or more processors, a recommendation to the computing device to not install the software product update.

4. The method of claim 1, further comprising:
    responsive to determining that the software product update does modify at least one function of the software product that corresponds to historical usage information that exceeds a minimum usage threshold condition, providing, by one or more processors, a recommendation to the computing device to install the software product update, wherein the provided recommendation includes a selectable link to install the software product update.

5. The method of claim 1, further comprising:
    monitoring, by one or more processors, usage of the software product by the computing device to determine historical usage information utilizing variable counters associated with program code corresponding to functions of the software product, and
    wherein a variable counter increments historical usage information that corresponds to a function of the software product each time that the computing device utilizes program code corresponding to the function of the software product.

6. A computer program product for managing updates for a software product, the computer program product comprising:
    one or more computer readable storage media and program instructions stored on the one or more computer readable storage media, the program instructions comprising:
    program instructions to receive a request to install a software product update, wherein the software product update modifies a software product on a computing device;
    program instructions to identify a first set of one or more functions of the software product that are to be modified by the software product update;
    program instructions to identify historical usage information corresponding to the software product, wherein the historical usage information indicates a second set of one or more functions of the software product and a number of times each respective function of the second set of one or more functions of the software product has been used by the computing device;

program instructions to determine whether the first set of one or more functions of the software product and the second set of one or more functions of the software product contain at least one common function of the software product; and responsive to determining that the first set of one or more functions of the software product and the second set of one or more functions of the software product do contain at least one common function of the software product, program instructions to determine that one or more of the at least one common function has corresponding historical usage information that exceeds the minimum usage threshold condition.

7. The computer program product of claim 6, further comprising program instructions, stored on the one or more computer readable storage media, to:

responsive to determining that the software product update does modify at least one function of the software product that corresponds to historical usage information that exceeds a minimum usage threshold condition, install the software product update on the computing device.

8. The computer program product of claim 6, further comprising program instructions, stored on the one or more computer readable storage media, to:

responsive to determining that the software product update does not modify at least one function of the software product that corresponds to historical usage information that exceeds a minimum usage threshold condition, provide a recommendation to the computing device to not install the software product update.

9. The computer program product of claim 6, further comprising program instructions, stored on the one or more computer readable storage media, to:

responsive to determining that the software product update does modify at least one function of the software product that corresponds to historical usage information that exceeds a minimum usage threshold condition, provide a recommendation to the computing device to install the software product update, wherein the provided recommendation includes a selectable link to install the software product update.

10. The computer program product of claim 6, further comprising program instructions, stored on the one or more computer readable storage media, to:

monitor usage of the software product by the computing device to determine historical usage information utilizing variable counters associated with program code corresponding to functions of the software product, and wherein a variable counter increments historical usage information that corresponds to a function of the software product each time that the computing device utilizes program code corresponding to the function of the software product.

11. A computer system for managing updates for a software product, the computer system comprising:

one or more computer processors;

one or more computer readable storage media; and program instructions stored on the computer readable storage media for execution by at least one of the one or more processors, the program instructions comprising:

program instructions to receive a request to install a software product update, wherein the software product update modifies a software product on a computing device;

program instructions to identify a first set of one or more functions of the software product that are to be modified by the software product update;

program instructions to identify historical usage information corresponding to the software product, wherein the historical usage information indicates a second set of one or more functions of the software product and a number of times each respective function of the second set of one or more functions of the software product has been used by the computing device;

program instructions to determine whether the first set of one or more functions of the software product and the second set of one or more functions of the software product contain at least one common function of the software product; and responsive to determining that the first set of one or more functions of the software product and the second set of one or more functions of the software product do contain at least one common function of the software product, program instructions to determine that one or more of the at least one common function has corresponding historical usage information that exceeds the minimum usage threshold condition.

12. The computer system of claim 11, further comprising program instructions, stored on the computer readable storage media for execution by at least one of the one or more processors, to:

responsive to determining that the software product update does modify at least one function of the software product that corresponds to historical usage information that exceeds a minimum usage threshold condition, install the software product update on the computing device.

13. The computer system of claim 11, further comprising program instructions, stored on the computer readable storage media for execution by at least one of the one or more processors, to:

responsive to determining that the software product update does not modify at least one function of the software product that corresponds to historical usage information that exceeds a minimum usage threshold condition, provide a recommendation to the computing device to not install the software product update.

14. The computer system of claim 11, further comprising program instructions, stored on the computer readable storage media for execution by at least one of the one or more processors, to:

responsive to determining that the software product update does modify at least one function of the software product that corresponds to historical usage information that exceeds a minimum usage threshold condition, provide a recommendation to the computing device to install the software product update, wherein the provided recommendation includes a selectable link to install the software product update.

15. The computer system of claim 11, further comprising program instructions, stored on the computer readable storage media for execution by at least one of the one or more processors, to:

monitor usage of the software product by the computing device to determine historical usage information utilizing variable counters associated with program code corresponding to functions of the software product, and wherein a variable counter increments historical usage information that corresponds to a function of the software product each time that the computing device utilizes program code corresponding to the function of the software product.

\* \* \* \* \*